May 21, 1940.  J. ROBINSON  2,201,203
AUTOMATIC TRAIN PIPE CONNECTOR AND CAR COUPLER SLACK CONTROL MEANS
Filed March 18, 1937  5 Sheets-Sheet 1

INVENTOR.
JOSEPH ROBINSON
BY Robb & Robb
ATTORNEYS.

May 21, 1940. J. ROBINSON 2,201,203
AUTOMATIC TRAIN PIPE CONNECTOR AND CAR COUPLER SLACK CONTROL MEANS
Filed March 18, 1937 5 Sheets-Sheet 2

INVENTOR
JOSEPH ROBINSON
BY Robb & Robb
ATTORNEY

May 21, 1940.         J. ROBINSON         2,201,203
AUTOMATIC TRAIN PIPE CONNECTOR AND CAR COUPLER SLACK CONTROL MEANS
Filed March 18, 1937         5 Sheets-Sheet 3

INVENTOR
JOSEPH ROBINSON
BY Robb & Robb
ATTORNEY

May 21, 1940. J. ROBINSON 2,201,203
AUTOMATIC TRAIN PIPE CONNECTOR AND CAR COUPLER SLACK CONTROL MEANS
Filed March 18, 1937 5 Sheets-Sheet 4

INVENTOR
JOSEPH ROBINSON
BY
ATTORNEY

May 21, 1940.  J. ROBINSON  2,201,203
AUTOMATIC TRAIN PIPE CONNECTOR AND CAR COUPLER SLACK CONTROL MEANS
Filed March 18, 1937  5 Sheets-Sheet 5
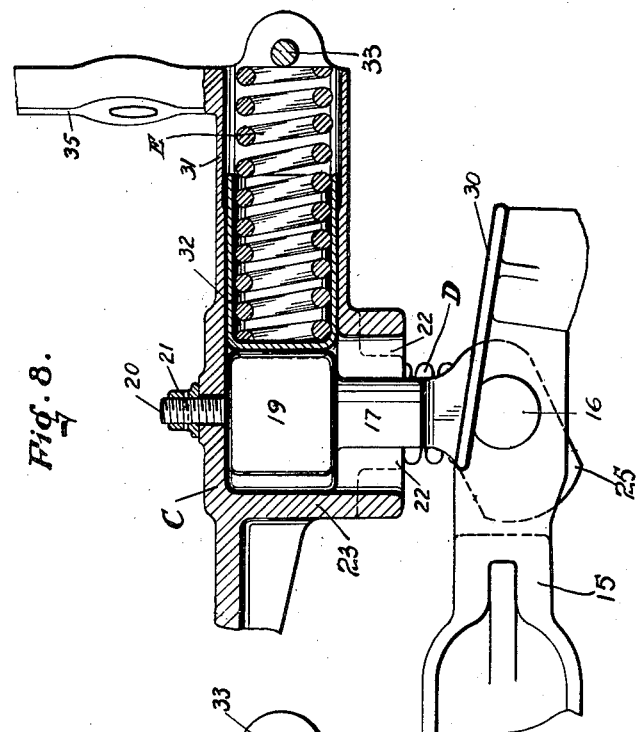
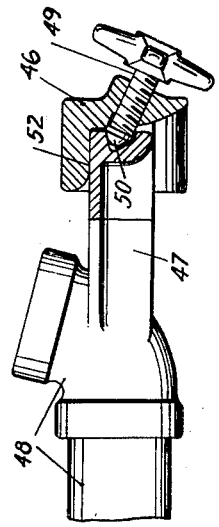
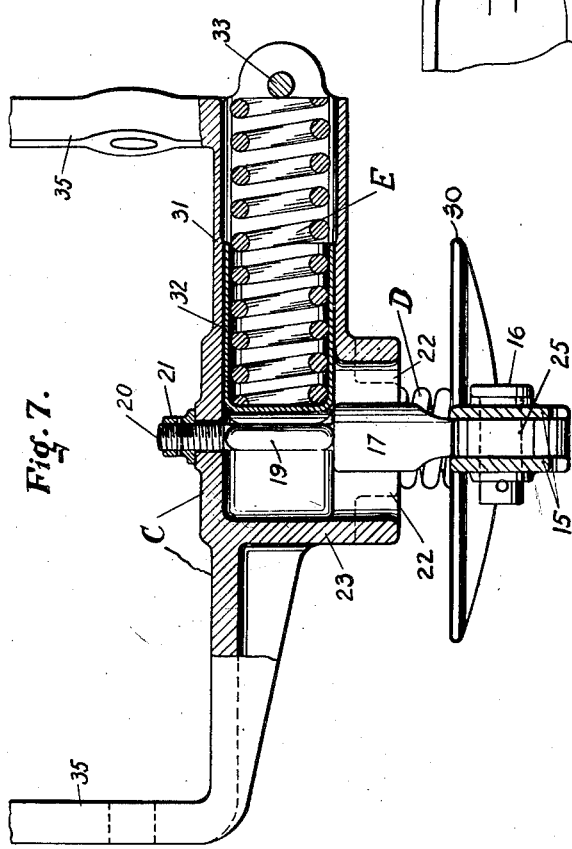
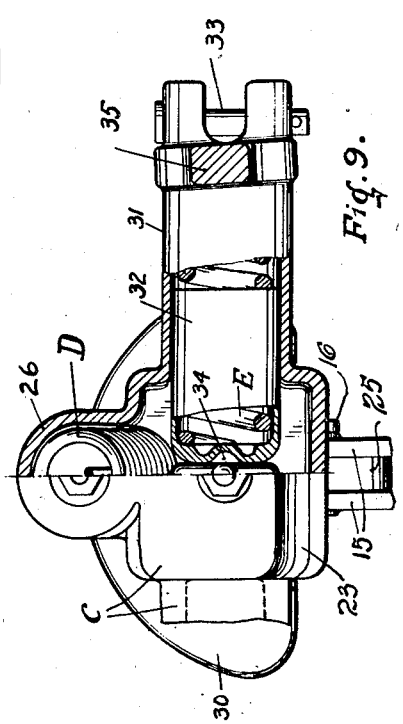
INVENTOR
JOSEPH ROBINSON
BY *Robb & Robb*
ATTORNEY Patented May 21, 1940

2,201,203

UNITED STATES PATENT OFFICE 2,201,203

AUTOMATIC TRAIN PIPE CONNECTOR AND CAR COUPLER SLACK CONTROL MEANS

Joseph Robinson, New York, N. Y., assignor of one-half to Roy M. Wolvin

Application March 18, 1937, Serial No. 131,583

10 Claims. (Cl. 213—76)

This invention relates to automatic train pipe connectors and car coupler slack control means. Among its objects is to provide an automatic connector in which the yieldable means for forwardly projecting the connector is carried in the head of the car coupler to which the connector is attached. The arrangement is such that the projecting means of the connector serves, in combination with the connector, to maintain coupled coupler heads in draft engagement, thereby controlling or minimizing the longitudinal slack between mated couplers. This desirable result is an important contribution not only to the efficient operation of the automatic connector but to better and more satisfactory performance of the coupler itself. Longitudinal slack in automatic car couplers has become a serious factor in the smooth handling of present day long passenger and freight trains. Other objects and advantages of my invention will appear from the following drawings in which Figure 1 is a side elevation of my improved slack-control connector attached to a car coupler of the vertical plane type;

Figure 7 is a sectional front elevation of the primary supporting mechanism of the automatic connector. In this view the yoke 15 is shown in section on about the line 7—7 of Figure 5;

Figure 8 is a sectional detail in front view of some of the connector supporting parts. In this view the connector yoke 15 and coupling head (not shown) are shifted to a position at right angles to the longitudinal direction of the railroad track for the purpose later to be described;

Figure 1:
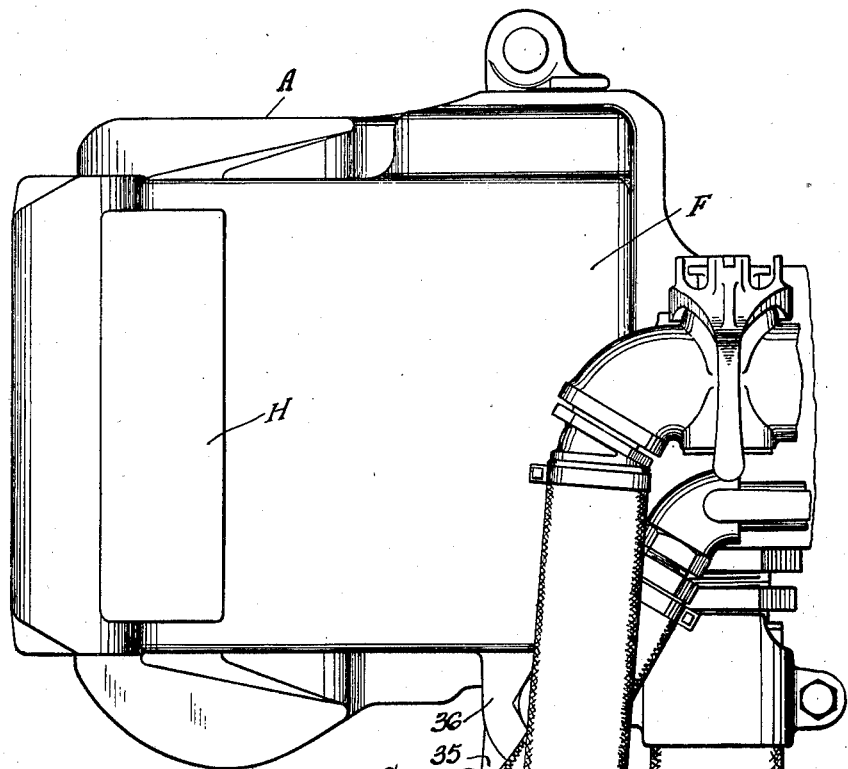
Figure 1:
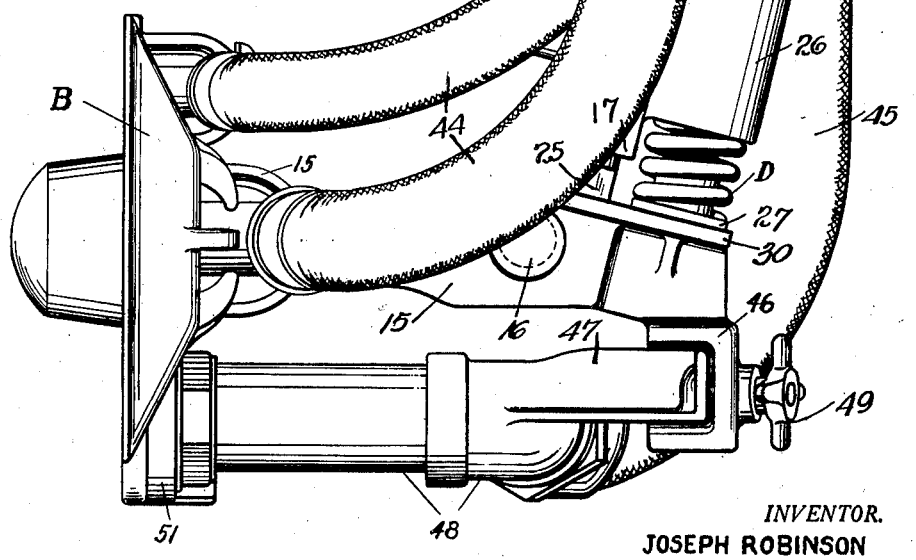
Figure 2:
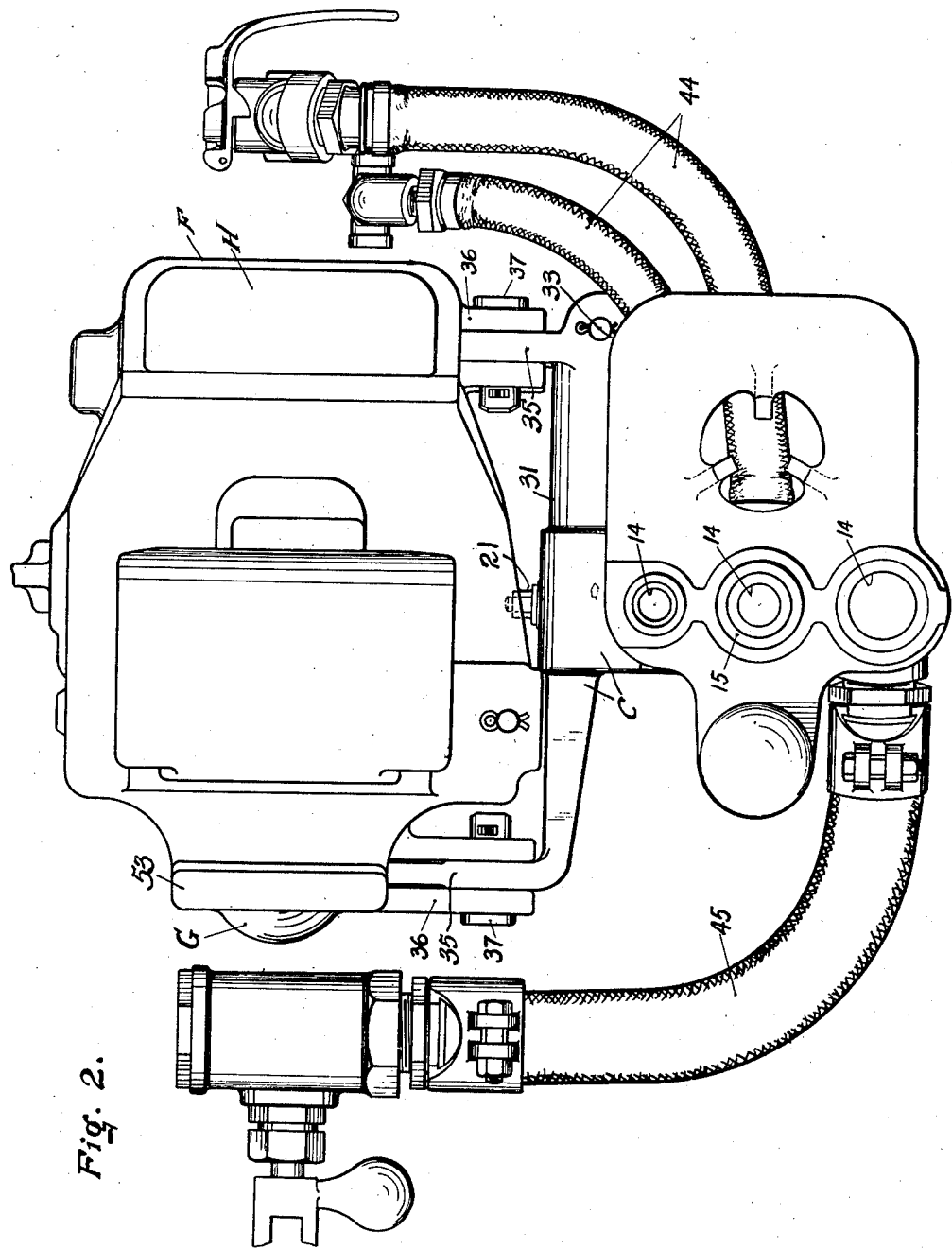
Figure 2 is a front elevation of the construction shown in Figure 1.
Figure 3:
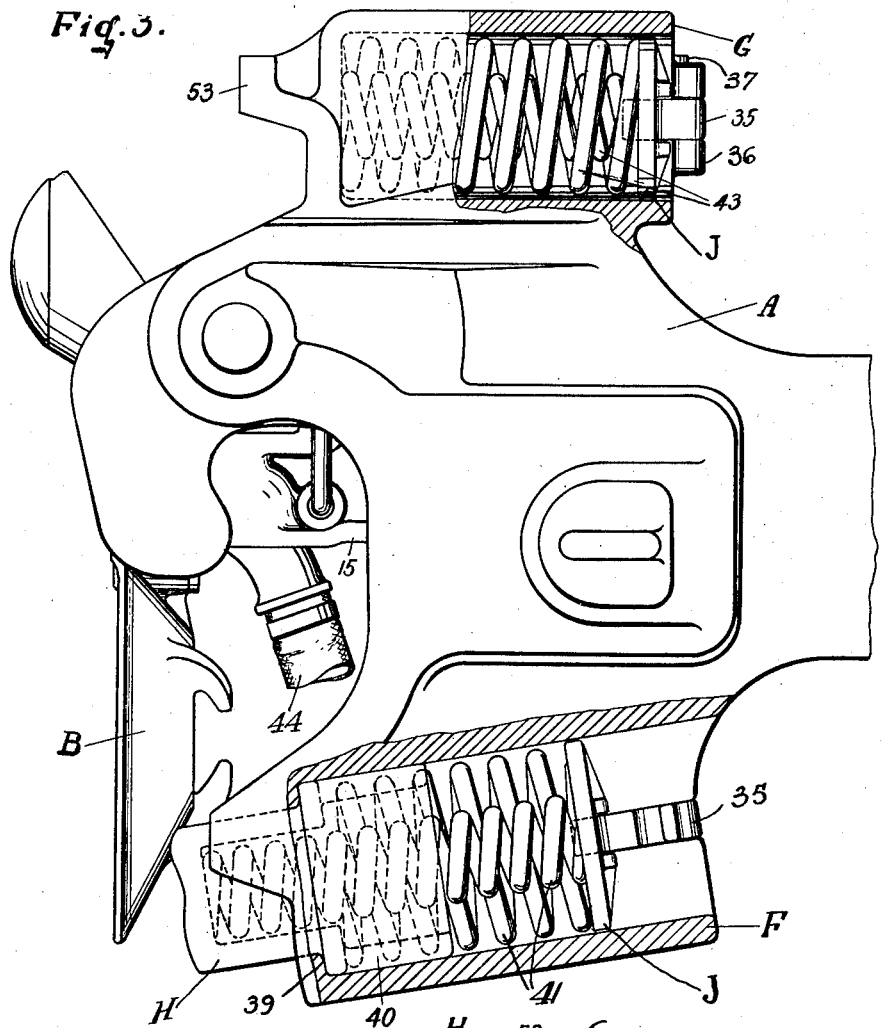
Figure 3 is a sectional plan view of the construction shown in Figures 1 and 2. In this view the yieldable means for forwardly projecting the connector is shown partly in section, and the train pipe hose are omitted.
Figure 5:
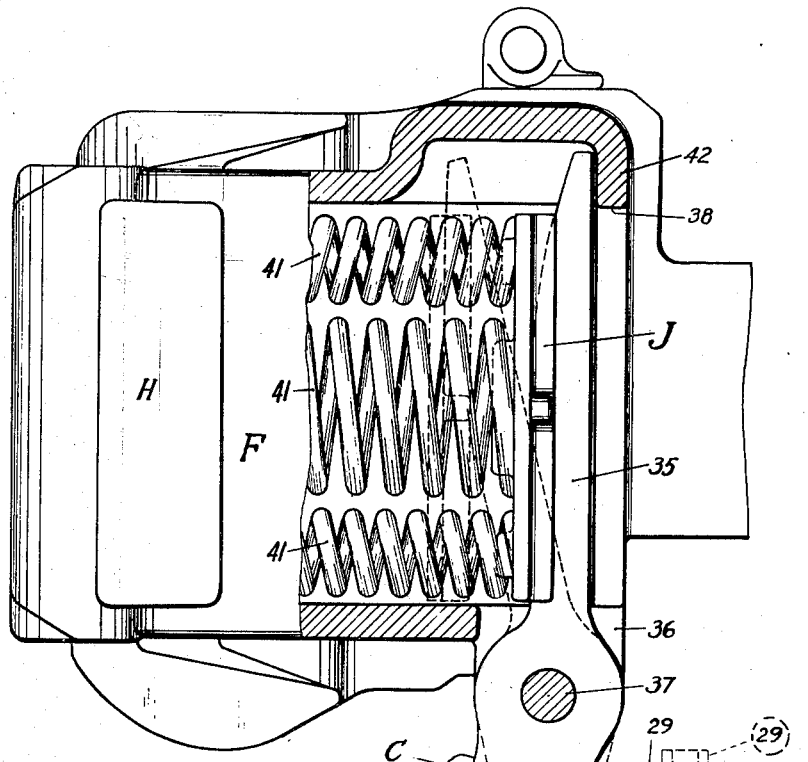
Figure 5 is a sectional side elevation of some of the parts shown in Figure 1.
Figure 6:
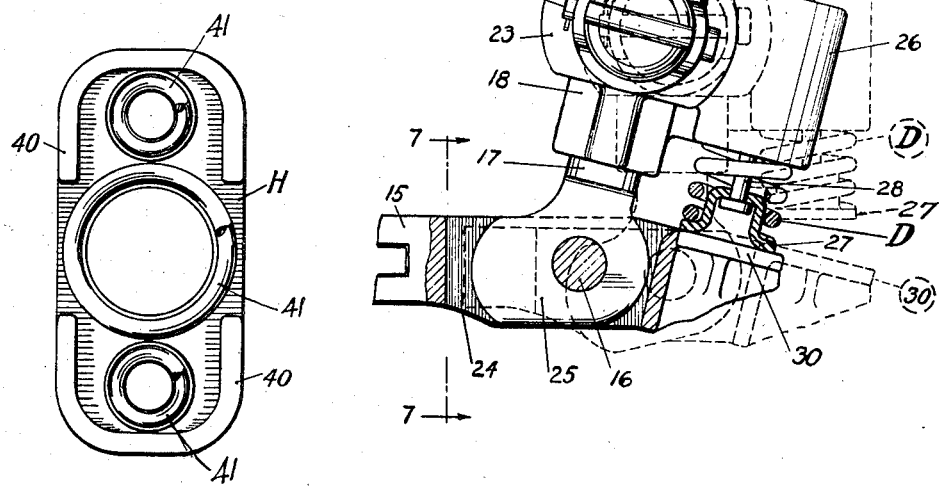
Figure 6 is a rear elevation of the plunger or compensator H that is movably mounted in the guard arm of the coupler.

Figure 9 is a sectional plan view of the supporting mechanism of the automatic connector. In this view some of the parts are broken away, and Figure 10 is a sectional plan view of the means for removably anchoring the steam hose fitting 47 in place. To the Janney type of vertical plane coupler A, although of course any other type of coupler may be used with my invention, I suitably connect my improved automatic connector. The connector consists of a coupling head B of any desired construction for bringing the various ports 14, Figure 2, and such electrical conduits or terminals as may be employed, into alignment when coupling. The head is mounted on a suitable yoke 15 which is pivotally connected at 16, Figure 5, to a horizontally rotatable carrier 17, the cylindrical shank of which is mounted in a cylindrical bearing 18 on the bracket or rocker member C of the connector. The carrier is provided near its upper end with a transversely extending web or flange 19, Figures 7-8, upwardly extending from which is a threaded supporting shank 20 which supports the carrier in place through the medium of a nut 21. It will be understood of course that when the flange 19 is passed up through the openings or ways 22 of the bearing 18, and is turned at right angles thereto; its bottom rests upon the inner bottom surface of the housing 23 of the bracket C and hence co-operates with the nut 21 and flange 19 to support the carrier 17. The yoke 15 is provided with an elongated opening 24 in which a shoe or foot 25 of the carrier is mounted and with which it fits quite closely. The foot is elongated to facilitate rotation of the carrier 17 when the connector pivots in a horizontal position. The pivot pin 16 passes through the yoke and the foot, permanently anchors the two parts together and provides free vertical pivotal movement of the connector on the carrier. This movement in the downward direction is resisted by a coil spring D mounted in a suitable housing 26 on the rear side of the bracket or rocker member C. The spring is retained in the housing under predetermined initial compression by means of tie members comprising a flange or seat 27 which protects the end of the spring against excessive wear, and a bolt 28 which passes through the spring and is adjustably anchored therein and in the housing by the nut 29. The arrangement is such that when the connector head is pushed back in the act of coupling the rearwardly extending semi-circular flange 30, against which the lower end of the spring D normally acts, moves out of engagement with the spring as shown in Figure 5.

To resist horizontal rocking of the connector head, and hence to always return the parts to the normal central position shown in Figures 1, 2, 3 and 7, I mount in the laterally extending hollow arm 31 of the rocker member a suitable coiled spring E over the inner end of which I mount a hollow sleeve 32. This sleeve fits reasonably closely in the rocker member and normally bears against the flat side of the flange 19 of the carrier 17. It is mounted in the rocker member under initial compression which is retained by inserting a suitable pin 33 or otherwise. Any movement of the connector head or yoke from the normal horizontal position shown in Figures 1 and 2 will be resisted by the spring E which will automaticaly return the parts to the normal position after the force which shifted them has been removed. In case it is desired for the purpose of facilitating interchange between a car equipped with the automatic connector and one not so equipped, or for other reason, to bring the connector head and yoke to a position at right angles to the track, as shown in Figure 8, this is accomplished by simply shoving the head around to that position whereupon one edge of the flange 19 drops into a shallow groove 34 at one end of the sleeve 32 and holds the connector in this transverse position until it is rotated slightly back toward the coupling position, moving the flange 19 out of the groove 34, whereupon the spring E will kick the parts back to normal position. During this horizontal rotation of the connector the shoe 27 at the lower end of the spring D rides on the semi-circular flange 30 and continues to maintain the connector in the normal horizontal position shown in Figure 1.

The rocker member or bracket C includes a pair of upwardly extending arms 35 which span the car coupler head and are pivotally mounted thereon through the medium of the lugs 36 and the pivot pins 37. These arms extend upwardly into housings F and G formed on opposite sides of the coupler, one being formed on the guard arm side and one on the knuckle side, Figure 3. Both of the housings are opened at the rear, and the one on the guard arm side is opened at both the rear and at the front. A vertically elongated suitable formed compensator or plunger H is mounted in the housing on the guard arm side of the coupler by inserting it through the opening 38 in the rear of the housing. The compensator is reduced in width at its forward end to form a shoulder to abut the flange 39 at the forward end of the housing F, Figure 3, and limit the forward movement of the compensator in the housing. The shank 40 of the compensator is quite long and fits fairly closely in the housing to guide it well in its movement in the housing. A plurality of vertically spaced springs 41, I show three, are mounted in the housing F with their forward ends engaging and extending into the back of the compensator H and with their rear ends resting on a spring seat J which is mounted on the curved front face of the arm 35 of the rocker member C. These springs are placed under suitable initial compression before the arm 35 is inserted up through the housing F and into engagement with the wall 42 at the top of the housing. This manner of arranging the arm in the housing enables it to serve as a stop for the springs 41 when the compensator H is pushed rearwardly as the couplers connect. The mounting of the springs 43 in the housing on the knuckle side of the coupler is similar to this arrangement except that no compensator H is provided on this side of the coupler to engage the forward end of the springs.

The train pipe hose 44 are suitably connected to my improved connector, the connection of the steam hose 45 thereto deserving particular note. The yoke 15 includes a lug 46, Figure 1, which extends downwardly from the rear end of the yoke and beneath the spring flange 30. The lug is provided with a bearing which curves rearwardly and downwardly, Figure 10, to guidingly receive the rear end of an arm 47 integrally formed with the removable steam hose fitting 48. A suitable retaining screw 49 is threadingly mounted in the lug at an angle to the longitudinal direction of the connector, its forward end 50 being enlarged to prevent extraction rearwardly from its threaded bearing. This screw mates with a bearing in the arm and thrusts the steam hose fitting forward into secure engagement with a seat 51 in the connector head, and at the same time forces the arm 47 of the fitting against the rear wall 52 of the bearing 46 to firmly prevent rotation of the fitting in the bearing or connector head. It will be noted, especially in Figure 1, that the point of connection between the steam hose 45 and the fitting 48 is always directly under the pivots 16 and 17. This arrangement provides the important advantage of reducing to a minimum the movement and strain on the steam hose when the connectors negotiate curves and inequalities in car heights.

Figure 4:
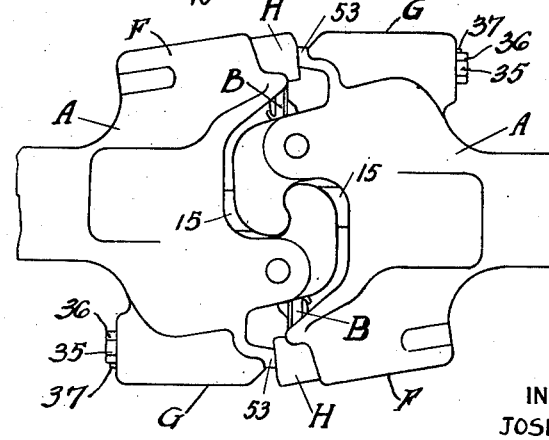
Figure 4 is a plan view of a pair of coupled car couplers such as shown in Figure 1 provided with my improvement. In this view the train pipe hose are omitted.

In operation the guiding means of the connector head B brings the various ports and electrical conduits (not shown) into alignment as the cars couple under conditions of vertical or lateral disalignment, movement of the connectors to accommodate alignment being allowed through the vertical pivot bearing 18 of the carrier 17 and the horizontal pivot 37 of the rocker member C. As the couplers move in to the coupled position the connector's supporting mechanism is shifted rearwardly to the position shown in dotted lines in Figure 5. This throws the arms 35 forward against the resistance of the springs 41 and 43. When the couplers reach the final coupled position the compensator of plunger H will have been compressed rearwardly a slight amount against the tension of the springs 41 mounted in the guard arm side of the coupler head. This tension is such as to maintain the couplers generally always in the draft position shown in Figure 4 and thus minimize or control longitudinal slack between the coupler heads. As will be seen in this figure the lugs 53 on the knuckle side of the coupler engage the movable compensator H to press the latter rearwardly against the tension of the springs 41. When the couplers angle to accommodate track curves additional compressional action of this kind occurs and one of the compensators or plungers H is moved farther rearwardly. This increases the force of the springs 41 against the arm 35, Figure 5, making more firm the joint between the faces of mated connector heads B. The resistance rate of the springs necessary to generally hold the coupler heads in the draft position, Figure 4, eliminates the need of a lock on the connector itself in order to hold the highest train line pressures.

What I claim is:

1. In combination, a car coupler, an automatic train pipe connector operating in unison with said coupler, said connector including a coupling head, yieldable pressure means for projecting said head forwardly, said means being positioned above the connector and serving also to control longitudinal slack between mated car couplers equipped with said connector.

2. In combination, a car coupler, an automatic train pipe connector operating in unison with said coupler, said connector including a coupling head, means supporting said coupling head so as to afford for universal movement thereof, said means including a member pivoted on said coupler for rocking movement thereon, and additional means cooperating with said supporting means for urging said connector head forward and for controlling the slack between mated car couplers equipped with said connector.

3. In combination, an automatic train pipe connector and a car coupler, the connector being mounted on the car coupler for universal movement and having a coupling head, yieldable pressure means for projecting said head forwardly and for controlling slack between mated couplers, and spring means for resisting universal movement of the connector.

4. In combination, an automatic train pipe connector and a car coupler, the connector being attached to the coupler and having rocking movement relative thereto, means for resisting such movement and for controlling the slack between mated couplers, said means including a bracket, a member mounted on the bracket for pivotal movement in the horizontal plane, and resilient means for resisting such movement of said member.

5. In combination, an automatic train pipe connector and a car coupler, the connector being attached to the coupler and including a head having vertical and horizontal rocking movement relative thereto, a rocker member spanning the head of said coupler and pivotally mounted thereon, springs acting against upwardly extending arms of said rocker member to project said connector head forward and control slack between mated couplers, and means carried by the rocker member for yieldingly resisting vertical and horizontal movement of said connector head and for returning the head to normal uncoupled position when shifted therefrom.

6. In combination, an automatic train pipe connector and a car coupler, the connector being attached to the coupler and including a head having vertical and horizontal rocking movement relative thereto, a rocker member spanning the head of said coupler and pivotally mounted thereon, springs acting against upwardly extending arms of said rocker member to project said connector head forward and control slack between mated couplers, and means carried by the rocker member for yieldingly resisting vertical and horizontal movement of said connector head and for returning the head to normal uncoupled position when shifted therefrom, said means permitting the connector head to be shifted to a position at approximately a right angle to the longitudinal direction of said coupler and to be yieldingly held in that position.

7. In combination, an automatic train pipe connector and a car coupler, the connector being attached to the coupler and including a head having vertical and horizontal rocking movement relative thereto, a rocker member spanning the head of said coupler and pivotally mounted thereon, springs acting against upwardly extending arms of said rocker member to project said connector head forward and control slack between mated couplers, and means carried by the rocker member for yieldingly resisting vertical and horizontal movement of said connector head and for returning the head to normal uncoupled position when shifted therefrom, said means including a spring acting in a direction at approximately a right angle to the longitudinal axis of said car coupler.

8. In combination, a car coupler, an automatic train pipe connector operating in unison therewith, said connector being provided with a coupling head, and common means for urging said head forwardly relative to said coupler and for urging the coupler rearwardly with respect to a companion coupler to hold joined couplers in draft engagement and to place mated connector heads under pressure.

9. The combination of parts described in claim 8 in which said common means comprises a plurality of springs in parallel arrangement.

10. In combination, a car coupler and an automatic train pipe connector operating in unison, said connector including a bracket pivotally mounted on the car coupler, a coupling head mounted on said bracket for universal movement, spring means reacting against said coupler for urging said head forward against a companion head, and additional spring means arranged transversely of the longitudinal direction of the connector and carried by said connector for yieldingly resisting pivotal movement of said coupling head in the horizontal plane.

JOSEPH ROBINSON.